(12) United States Patent
Murata et al.

(10) Patent No.: US 11,750,485 B2
(45) Date of Patent: Sep. 5, 2023

(54) ESTIMATION DEVICE, ESTIMATION METHOD, AND ESTIMATION PROGRAM

(71) Applicant: NIPPON TELEGRAPH AND TELEPHONE CORPORATION, Tokyo (JP)

(72) Inventors: Tetsuhiko Murata, Musashino (JP); Shingo Kashima, Musashino (JP); Hiroki Nagayama, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 25 days.

(21) Appl. No.: 17/617,931

(22) PCT Filed: Jun. 12, 2019

(86) PCT No.: PCT/JP2019/023380
§ 371 (c)(1),
(2) Date: Dec. 10, 2021

(87) PCT Pub. No.: WO2020/250362
PCT Pub. Date: Dec. 17, 2020

(65) Prior Publication Data
US 2022/0311684 A1    Sep. 29, 2022

(51) Int. Cl.
*H04L 43/18*      (2022.01)
*H04L 43/0817*    (2022.01)
*H04L 43/04*      (2022.01)

(52) U.S. Cl.
CPC .......... *H04L 43/04* (2013.01); *H04L 43/0817* (2013.01); *H04L 43/18* (2013.01)

(58) Field of Classification Search
None
See application file for complete search history.

(56) References Cited

U.S. PATENT DOCUMENTS

| 7,801,980 B1* | 9/2010 | Roesch | H04L 67/125 709/224 |
| 2009/0182864 A1* | 7/2009 | Khan | H04L 67/535 709/224 |
| 2013/0332456 A1* | 12/2013 | Arkin | G06F 16/285 707/737 |

OTHER PUBLICATIONS

Zalewski., "p0f v3 (version 3.09b)", Available Online at: http://lcamtuf.coredump.cx/p0f3/, Apr. 26, 2019, 4 pages.

* cited by examiner

*Primary Examiner* — Shirley X Zhang
(74) *Attorney, Agent, or Firm* — XSENSUS LLP

(57) ABSTRACT

An extraction unit 141 extracts predetermined pieces of information from each of a plurality of packets and sent from equipment 20. Then, an inference unit 142 infers a piece of equipment information that is information on the equipment 20, for each of the plurality of packets on the basis of the pieces of information extracted by the extraction unit 141. Then, the first selection unit 143 selects a predetermined piece of equipment information for each packet type from among pieces of equipment information on the basis of a level of detail of each piece of equipment information. Then, the second selection unit 144 selects, on the basis of a level of reliability predefined according to each packet type, a predetermined piece of equipment information corresponding to the equipment 20 from among pieces of equipment information inferred by the first selection unit 143.

17 Claims, 13 Drawing Sheets

Fig. 3

| PROTOCOL | PACKET TYPE | FIELD INFORMATION |
|---|---|---|
| TCP | ✓ SYN PACKET<br>✓ SYN + ACK PACKET | ✓ p0f signature<br>(PART OF TCP/IP HEADER) |
| PROTOCOL A | ✓ PACKET A-1<br>✓ PACKET A-2 | ✓ PACKET INFORMATION A1<br>✓ PACKET INFORMATION A2<br>✓ PACKET INFORMATION A3 |
| PROTOCOL B | ✓ PACKET B-1 | ✓ PACKET INFORMATION B1<br>✓ PACKET INFORMATION B2<br>✓ PACKET INFORMATION B3 |
| PROTOCOL C | ✓ PACKET C-1<br>✓ PACKET C-2 | ✓ PACKET INFORMATION C1<br>✓ PACKET INFORMATION C2<br>✓ PACKET INFORMATION C3<br>✓ PACKET INFORMATION C4<br>✓ PACKET INFORMATION C5<br>✓ PACKET INFORMATION C6 |
| PROTOCOL D | ✓ PACKET D-1 | ✓ PACKET INFORMATION D1<br>✓ PACKET INFORMATION D2 |
| HTTP | ✓ MESSAGE SENT BY HTTP CLIENT SUCH AS GET OR POST MESSAGE | ✓ User-Agent |

Fig. 4

| PACKET | METHOD OF INFERENCE | PRIMARY INFERENCE RESULT |
|---|---|---|
| TCP SYN | DICTIONARY MATCHING (pOf signature) → | Windows XP |
| TCP SYN + ACK (1) | DICTIONARY MATCHING (pOf signature) → | Windows XP |
| TCP SYN + ACK (2) | DICTIONARY MATCHING (pOf signature) → | Windows NT |
| PROTOCOL A PACKET A-1 | DICTIONARY MATCHING → | Windows NT |
| PROTOCOL A PACKET A-2 | DICTIONARY MATCHING → | Windows |
| PROTOCOL B PACKET B-1 | DICTIONARY MATCHING → | Windows XP |
| PROTOCOL C PACKET C-1 | DICTIONARY MATCHING → | Windows |
| PROTOCOL C PACKET C-2 | DICTIONARY MATCHING → | Windows XP |
| PROTOCOL D PACKET D-1 | RULE-BASED ANALYSIS → | Windows |
| HTTP Request (1) | RULE-BASED ANALYSIS ON USER-AGENT → | Windows |
| HTTP Request (2) | RULE-BASED ANALYSIS ON USER-AGENT → | Windows 10 |

Fig. 5

| PACKET | PRIMARY INFERENCE RESULT | LEVEL OF DETAIL | SECONDARY INFERENCE RESULT |
|---|---|---|---|
| TCP SYN | Windows XP | (HIGH) | Windows XP |
| TCP SYN + ACK (1) | Windows XP | (HIGH) | Windows XP |
| TCP SYN + ACK (2) | Windows NT | (MEDIUM) | |
| PROTOCOL A PACKET A-1 | Windows NT | (MEDIUM) | Windows NT |
| PROTOCOL A PACKET A-2 | Windows | (LOW) | |
| PROTOCOL B PACKET B-1 | Windows XP | (HIGH) | Windows XP |
| PROTOCOL C PACKET C-1 | Windows | (LOW) | |
| PROTOCOL C PACKET C-2 | Windows XP | (HIGH) | Windows XP |
| PROTOCOL D PACKET D-1 | Windows | (LOW) | Windows |
| HTTP Request (1) | Windows | (LOW) | |
| HTTP Request (2) | Windows 10 | (HIGH) | Windows 10 |

Fig. 7

| PACKET TYPE | LEVEL OF RELIABILITY | SECONDARY INFERENCE RESULT | LEVEL OF DETAIL | TERTIARY INFERENCE RESULT |
|---|---|---|---|---|
| TCP SYN | (HIGH) ← | Windows XP | (HIGH) → | |
| TCP SYN + ACK | | Windows XP | (HIGH) → | |
| PROTOCOL A PACKET A-1 | | Windows NT | (MEDIUM) | |
| PROTOCOL A PACKET A-2 | | Windows XP | (HIGH) → | Windows XP |
| PROTOCOL B PACKET B-1 | | Windows XP | (HIGH) → | |
| PROTOCOL C PACKET C-1 | | Windows | (LOW) | |
| PROTOCOL C PACKET C-2 | (LOW) | Windows 10 | (HIGH) | |
| PROTOCOL D PACKET D-1 | | | | |
| HTTP Request | | | | |

ESTIMATION DEVICE, ESTIMATION METHOD, AND ESTIMATION PROGRAM

CROSS-REFERENCE TO RELATED APPLICATION

The present application is based on PCT filing PCT/JP2019/023380, filed Jun. 12, 2019, the entire contents of which are incorporated herein by reference.

TECHNICAL FIELD

The present invention relates to an inference device, an inference method, and an inference program.

BACKGROUND ART

Methods for inferring, from a packet, information on a model and a running operating system (OS) of equipment that has sent the packet are conventionally known (for example, NPL 1). In addition, the inferred information on the equipment is utilized in a security operation such as identifying an effect of an attack packet.

CITATION LIST

Non Patent Literature

[NPL 1] p0f v3 (version 3.09b), [online], [retrieved on Jun. 3, 2019], Internet (http://lcamtuf.coredump.cx/p0f3/)

SUMMARY OF THE INVENTION

Technical Problem

However, the conventional methods have a problem; the methods can in some cases experience difficulty in obtaining clear information on the equipment that has sent the packet.

For example, in the method indicated in NPL 1, an SYN packet in transmission control protocol (TCP) communication is used to infer the type of the OS. Thus, in this technique, in the case where target equipment does not perform TCP communication, or in the case where the packet in the TCP communication does not pass through a packet observation location, the inference is difficult.

Means for Solving the Problem

To solve the problem and achieve an object, an inference device includes: an extraction unit that extracts predetermined pieces of information from each of a plurality of packets sent from equipment; an inference unit that infers a piece of equipment information that is information on the equipment, for each of the plurality of packets on the basis of the pieces of information extracted by the extraction unit; a first selection unit that selects a predetermined piece of equipment information for each packet type from among pieces of equipment information, on the basis of a level of detail of each piece of equipment information; and a second selection unit that selects, on the basis of a level of reliability predefined according to each packet type, a predetermined piece of equipment information corresponding to the equipment from among pieces of equipment information inferred by the first selection unit.

Effects of the Invention

The present invention is capable of providing clear information on the equipment that has sent the packets.

BRIEF DESCRIPTION OF DRAWINGS

FIG. 3 illustrates one example of type information.
FIG. 4 is an illustration for explaining primary inference.
FIG. 5 is an illustration for explaining secondary inference.
FIG. 7 is an illustration for explaining tertiary inference.

DESCRIPTION OF EMBODIMENTS

The following explains embodiments of an inference device, an inference method, and an inference program in the present application in detail on the basis the drawings. The present invention however is not limited by embodiments that will be explained below.

Figure 1:
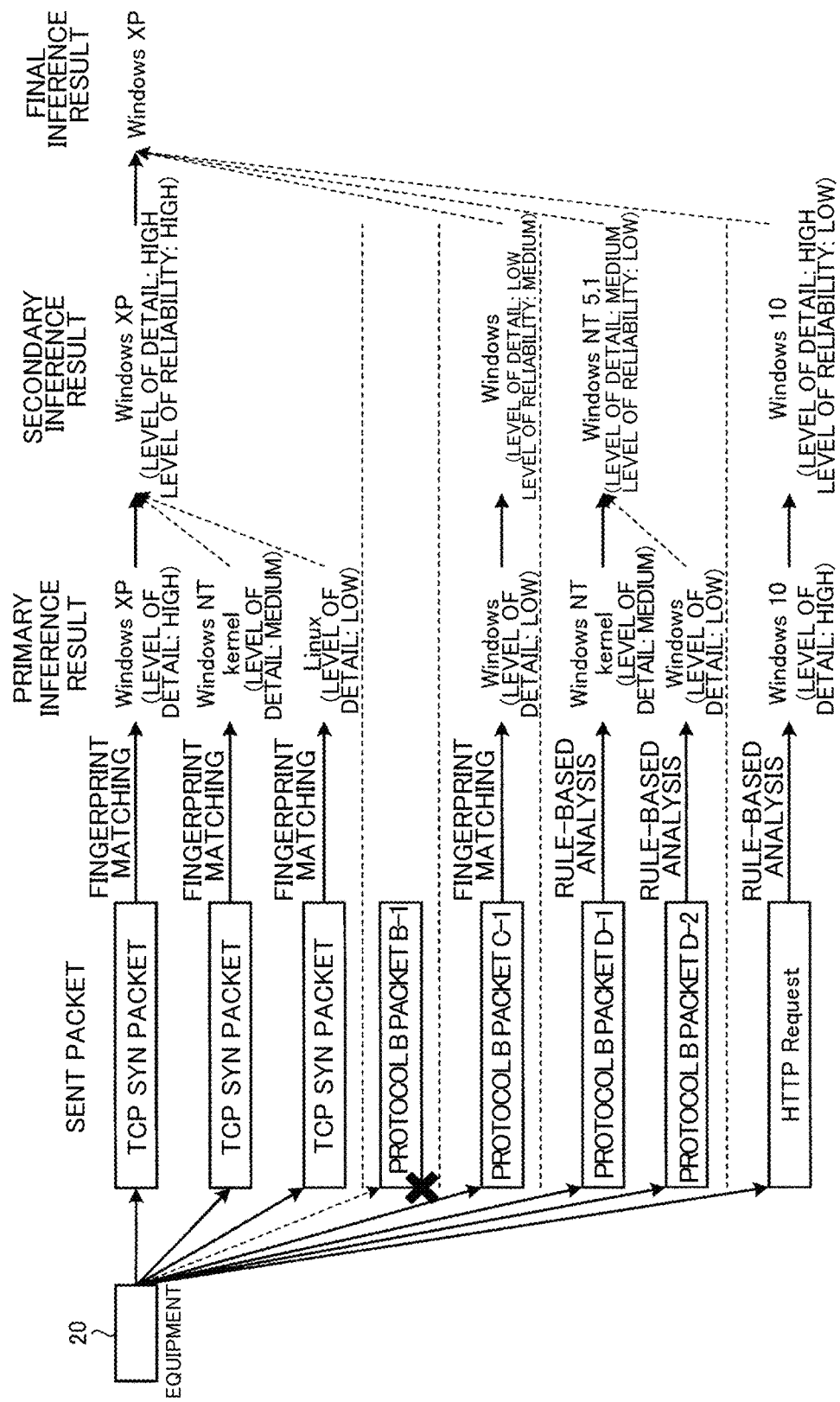
FIG. 1 is an illustration for explaining the flow of processing of an inference device according to a first embodiment.

FIG. 1 is an illustration for explaining the flow of processing of an inference device according to a first embodiment. As indicated in FIG. 1, an inference device 10 infers equipment information of equipment 20 on the basis of packets sent from the equipment 20. For example, the equipment 20 is a computer that is used as a server, a terminal, or the like. Note that the equipment information includes, for example, the name, distribution, version, and release of an OS running on the equipment 20, the name and version of firmware on the equipment 20, the manufacturer, model, and model number of the equipment 20, and so forth.

The equipment information is denoted like, for example, "Windows" and "Windows XP". In this case, the equipment information "Windows" indicates that the OS is of any of the versions of Windows (registered trademark) series. Alternatively, equipment information "Windows XP" indicates that the OS is of the version of Windows XP among the Windows series.

In the explanation hereafter, the degree of narrowing information with the equipment information is referred to as a level of detail. For example, the equipment information "Windows XP" is more detailed in information than the equipment information "Windows". Thus, the equipment information "Windows XP" has a higher level of detail than the equipment information "Windows".

As indicated in FIG. 1, packets that are sent from the equipment 20 are classified as any of multiple packet types. For example, the packet types include "TCP SYN", "HTTP Request", etc.

The inference device 10 first performs dictionary matching or rule-based analysis using packets, and thus obtains a primary inference result. The primary inference result is the equipment information of each packet. In the example in FIG. 1, the inference device 10 infers by dictionary matching that the equipment information of a TCP SYN packet 201 is "Windows XP". Alternatively, the inference device 10 infers, for example, by rule-based analysis that the equipment information of a HTTP Request packet 209 is "Windows 10".

Next, the inference device 10 obtains a secondary inference result on the basis of a level of detail of each piece of equipment information of the primary inference result. The secondary inference result is equipment information for each packet type. In the example in FIG. 1, the inference device 10 picks, as the secondary inference result of TCP SYN packets, "Windows XP" that has a highest level of detail from among three pieces of equipment information of the TCP SYN packets.

The inference device 10 further obtains a tertiary inference result on the basis of a level of reliability predefined according to each packet type and the secondary inference result. The tertiary inference result is the equipment information of the equipment 20. In the example in FIG. 1, the inference device 10 picks, as the tertiary inference result, the equipment information "Windows XP" of the TCP SYN packets, which have a highest level of reliability among the packet types.

Meanwhile, conventional methods sometimes focus attention on a packet called "protocol B Packet B-1" alone to make analysis. In this case, if the sending of a packet of the packet type of "protocol B Packet B-1" is disabled, as in FIG. 1, then it would be difficult to infer the equipment information of the equipment 20 by such conventional methods. In contrast, multiple packet types can be used to make analysis in the present embodiment. The inference device 10 is thus capable of inferring the equipment information of the equipment 20 even if the sending of "protocol B Packet B-1" is disabled.

Functional Configuration

Figure 2:
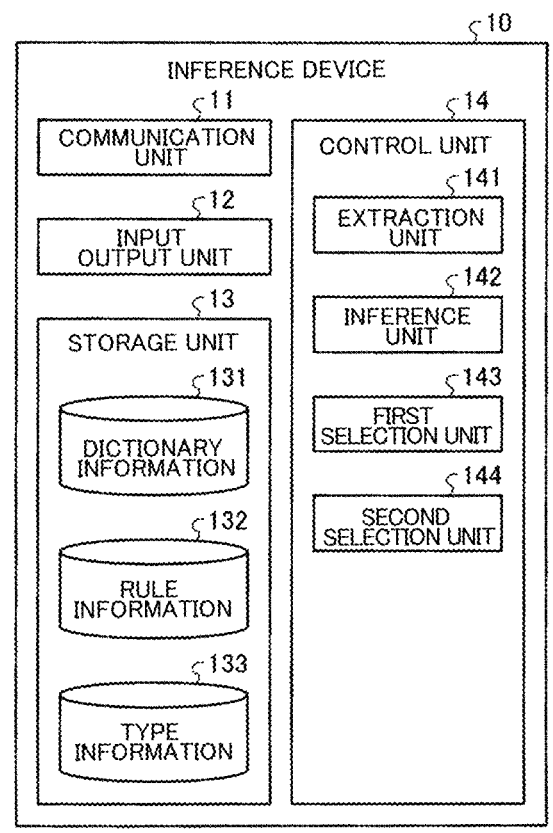
FIG. 2 illustrates one example of the configuration of the inference device according to the first embodiment.

The configuration of the inference device according to the first embodiment is now explained using FIG. 2. FIG. 2 illustrates one example of the configuration of the inference device according to the first embodiment. As indicated in FIG. 2, the inference device 10 includes a communication unit 11, an input output unit 12, a storage unit 13, and a control unit 14.

The communication unit 11 makes data communication with another device via a network. The communication unit 11 is, for example, a network interface card (NIC). The input output unit 12 receives an input of data from a user, and outputs data. The input output unit 12 is, for example, an input device such as a mouse or a keyboard, and a display device such as a display.

The storage unit 13 is a storage device such as a hard disk drive (HDD), a solid state drive (SSD), or an optical disc. Alternatively, the storage unit 13 may be a semiconductor memory that allows data to be rewritten therein, such as a random access memory (RAM), a flash memory, or a non-volatile static random access memory (NVSRAM). The storage unit 13 stores an OS and various programs that are executed in the inference device 10. The storage unit 13 further stores various items of information for use in execution of the programs. The storage unit 13 further stores dictionary information 131, rule information 132, and type information 133.

The dictionary information 131 is information in which predetermined keywords and pieces of equipment information corresponding to the keywords are associated with each other. Furthermore, the piece of equipment information in the dictionary information 131 may beforehand be associated with the level of detail.

The rule information 132 is information in which predetermined rules and pieces of equipment information corresponding to the rules are associated with each other. The rules include, for example, a combination of determination conditions for inferring the equipment information by using, as input information, a character string, a sign, etc., extracted from a packet.

The type information 133 is information on the packet types. FIG. 3 illustrates one example of the type information. As indicated in FIG. 3, the type information 133 includes protocols, packet types, and pieces of packet information. The packet information is a field that is extracted by an extraction unit 141, which will be described later. For example, the extraction unit 141 extracts p0f signature from an SYN packet and an SYN+ACK packet. Alternatively, the extraction unit 141 extracts, for example, User-Agent from a packet of Request message (GET, POST, or the like) in the HTTP protocol.

The control unit 14 controls the entire inference device 10. The control unit 14 is, for example, an electronic circuit such as a central processing unit (CPU) or a micro processing unit (MPU), or an integrated circuit such as an application specific integrated circuit (ASIC) or a field programmable gate array (FPGA). The control unit 14 has an internal memory for storing programs that define the steps of various processes, and control data, and executes the processes using the internal memory. In addition, the control unit 14 functions as various processing units as a result of the operations of the various programs. For example, the control unit 14 includes the extraction unit 141, an inference unit 142, a first selection unit 143, and a second selection unit 144.

The extraction unit 141 extracts predetermined pieces of information from each of a plurality of packets sent from the equipment 20. As mentioned above, the extraction unit 141 extracts a field value as described in the packet information of the type information 133.

The inference unit 142 performs primary inference. The inference unit 142 infers a pieces of equipment information that is information on the equipment 20, for each of the plurality of packets on the basis of the information extracted by the extraction unit 141. As indicated in FIG. 4, the inference unit 142 may beforehand sort and order the packets according to both or either of the sender MAC address or the sender IP address.

The inference unit 142 is capable of comparing a piece of information extracted by the extraction unit 141 with dictionary-format data beforehand prepared for each packet type, that is, the inference unit 142 is capable of performing dictionary matching. The dictionary information 131 is one example of the dictionary-format data. In addition, the inference unit 142 is capable of inferring the equipment information by analyzing a piece of information extracted by the extraction unit 141 by a beforehand-prepared rule. Whether to perform dictionary matching or rule-based analysis shall beforehand be defined according to the packet types.

In the case of dictionary matching, the inference unit 142 searches the field value extracted by the extraction unit 141 for a part that matches a keyword included in the dictionary information 131. On retrieving the matching part, the inference unit 142 infers a piece of equipment information associated with the keyword as the equipment information of a packet that is the extraction source.

In the case of rule-based analysis, the inference unit 142 inputs the field value extracted by the extraction unit 141 to a rule included in the rule information 132 to obtain a result of determination.

As indicted in FIG. 4, the inference unit 142 infers, for example, by dictionary matching that the equipment information of the packet of TCP SYN+ACK (1) is "Windows XP". Alternatively, as indicted in FIG. 4, the inference unit 142 infers, for example, "Windows 10" from the equipment information of the packet of HTTP Request (2) by rule-based analysis. Note that the number indicated in the brackets is attached to distinguish packets of the same type.

The first selection unit 143 performs secondary inference. The first selection unit 143 selects a predetermined piece of equipment information for each packet type from among the equipment information on the basis of the level of detail of each piece of equipment information. As indicated in FIG. 5, the first selection unit 143 selects, for example, a piece of equipment information having a highest level of detail for each packet type from among the equipment information. FIG. 5 is an illustration for explaining the secondary inference.

As indicated in FIG. 5, the first selection unit 143 infers, for example, "Windows XP" alone as the equipment information of the TCP SYN packets because the "Windows XP" has a highest level of detail among multiple primary inference results of the TCP SYN packets.

The level of detail may beforehand be included in the dictionary information 131. In this case, in the case where the inference unit 142 infers the equipment information by comparison with the dictionary information 131, the first selection unit 143 selects a piece of equipment information on the basis of the level of detail included in the dictionary information 131.

Figure 6:
FIG. 6 is an illustration for explaining a level of detail.

The level of detail in the dictionary information 131 may be determined according to the criteria indicated in FIG. 6. FIG. 6 is an illustration for explaining the level of detail. For example, FIG. 6 indicates that a keyword that can identify even an OS name+version (e.g. Windows XP) is set to have a high level of detail. Alternatively, FIG. 6 indicates, for example, that a keyword that can simply identify an OS type (e.g. Linux (registered trademark)) is set to have a low level of detail.

In the case where the inference unit 142 infers the equipment information by rule-based analysis, the first selection unit 143 selects a piece of equipment information on the basis of a level of detail that is calculated in accordance with a preset condition. For example, the level of detail of a packet with a protocol of HTTP may be determined according to similar criteria to that in FIG. 6. Alternatively, the level of detail of packets may collectively be set to a specific value according to the protocol, for example.

In addition, the first selection unit 143 can order the equipment information according to types of the equipment information, and then select apiece of equipment information having a highest frequency of appearance. After this process, selection is carried out on the basis of the level of detail. Alternatively, prior to selection by the first selection unit 143, the inference unit 142 may classify the equipment information according to the types of the equipment information inferred by the inference unit, and exclude apiece of equipment information having a low frequency of appearance among the equipment information from the selection. Note that the types of the equipment information include, for example, an OS type.

A second selection unit 144 performs tertiary inference. The second selection unit 144 selects, on the basis of a level of reliability predefined according to each packet type, a predetermined piece of equipment information corresponding to the equipment 20 from among the equipment information inferred by the first selection unit 143. The second selection unit 144 selects a piece of equipment information selected by the first selection unit 143 and corresponding to a packet type having a highest level of reliability.

FIG. 7 is an illustration for explaining the tertiary inference. As indicated in FIG. 7, one piece of equipment information is selected for each packet type by the second selection unit 144. In this process, the packet types shall be set to have respective levels of reliability. Among the packet types in FIG. 7, the TCP SYN+ACK packet shall have a highest level of reliability. In this case, the second selection unit 144 selects the equipment information "Windows XP" corresponding to the TCP SYN+ACK packet as a tertiary inference result.

In the present embodiment, the tertiary inference result is a final inference result. Thus, the inference device 10 infers that the OS of the equipment 20 is "Windows XP". The inference device 10 can output the final inference result via the communication unit 11 and the input output unit 12.

Meanwhile, the level of reliability may be defined such that it is inversely proportional to the possibility of packet characteristics information spoofing on each packet type. The possibility of spoofing is proportional to the degree of distribution of spoofing software for a target packet type.

Processing of First Embodiment

Figure 8:
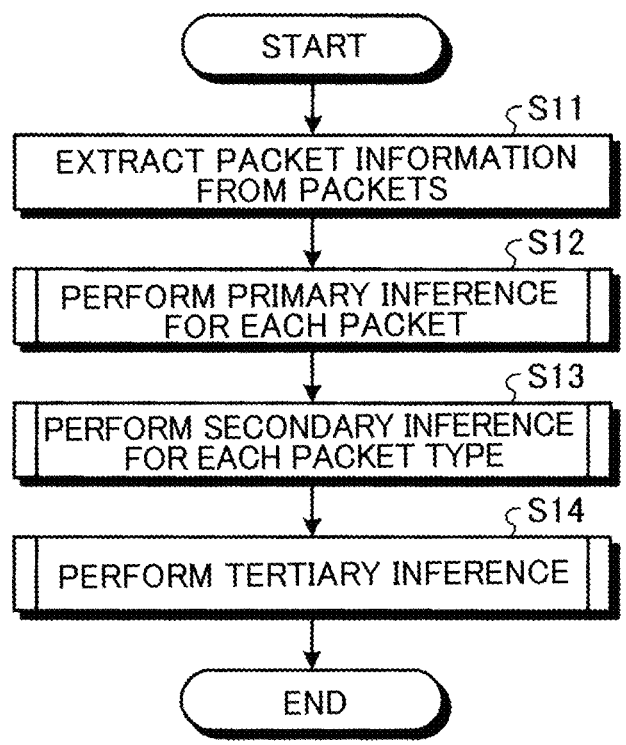
FIG. 8 is a flowchart that indicates the flow of processing of the inference device according to the first embodiment.

The following explains the flow of processing of the inference device 10, using FIG. 8. FIG. 8 is a flowchart that indicates the flow of the processing of the inference device according to the first embodiment. As indicated in FIG. 8, the inference device 10 first extracts packet information from packets (step S11).

Next, the inference device 10 performs the primary inference for each packet (step S12). Then, the inference device 10 performs the secondary inference for each packet type (step S13). The inference device 10 further performs the tertiary inference (step S14).

Figure 9:
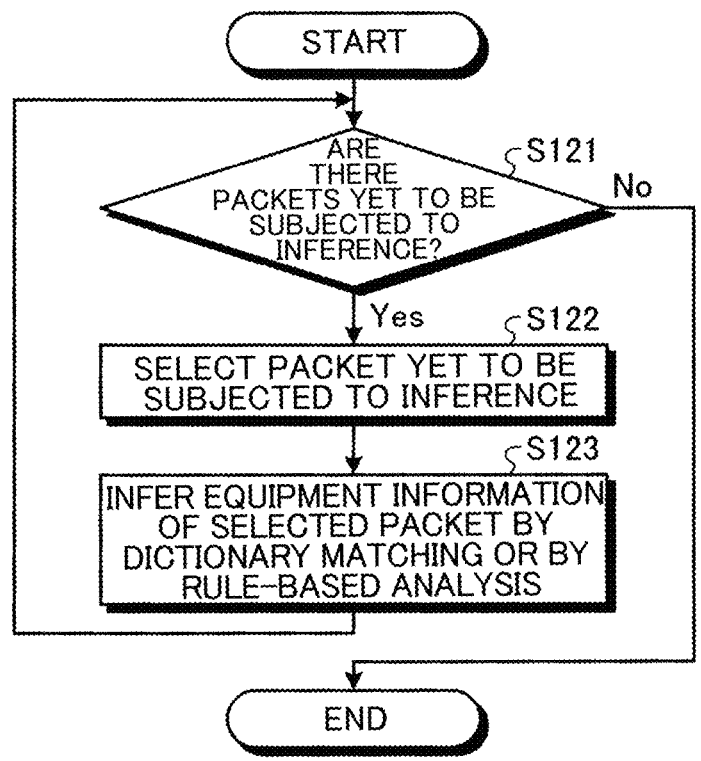
FIG. 9 is a flowchart that indicates the flow of a process for the primary inference.

The following explains the primary inference (step S12 in FIG. 8), using FIG. 9. FIG. 9 is a flowchart that indicates the flow of a process for the primary inference. First, in the case where there are packets yet to be subjected to the inference (step S121, Yes) , the inference device 10 selects any of the packets yet to be subjected to the inference (step S122).

Then, the inference device 10 infers the equipment information of the selected packet with dictionary information or by rule-based analysis (step S123). Thereafter, the inference device 10 returns to the step S121, and repeats the process. In the case where there are no packets yet to be subjected to the inference (step S121, No), the inference device 10 terminates the primary inference.

Figure 10:
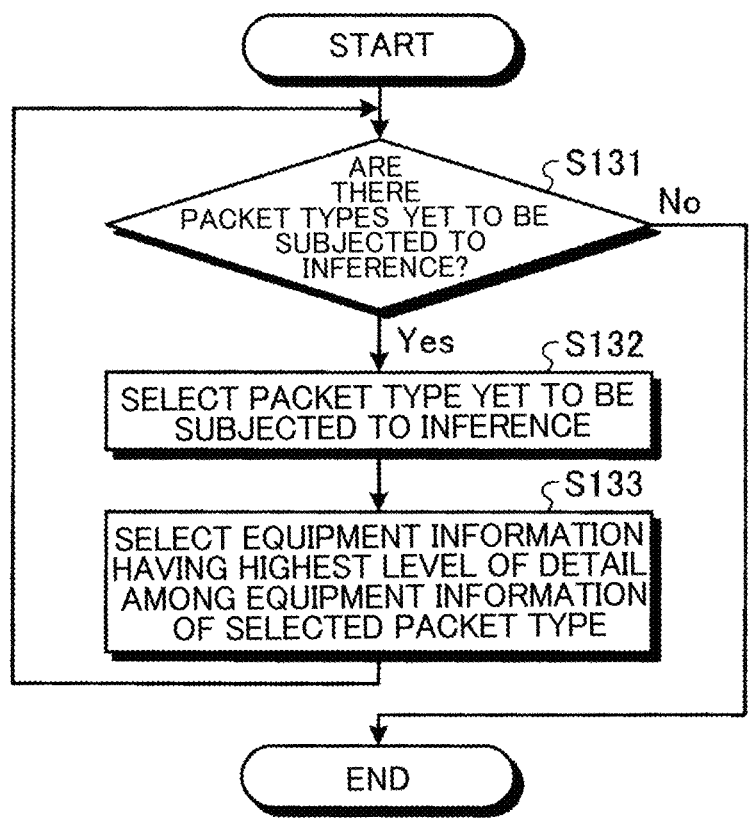
FIG. 10 is a flowchart that indicates the flow of a process for the secondary inference.

The following explains the secondary inference (step S13 in FIG. 8), using FIG. 10. FIG. 10 is a flowchart that indicates the flow of a process for the secondary inference. First, in the case where there are packet types yet to be subjected to the inference among the packet types (step S131, Yes), the inference device 10 selects any of the packet types yet to be subjected to the inference (step S132).

Then, the inference device 10 selects apiece of equipment information having a highest level of detail among the equipment information of the selected packet type (step S133). Thereafter, the inference device 10 returns to the step S131, and repeats the process. In the case where there are no packet types yet to be subjected to the inference (step S131, No), the inference device 10 terminates the secondary inference.

Figure 11:
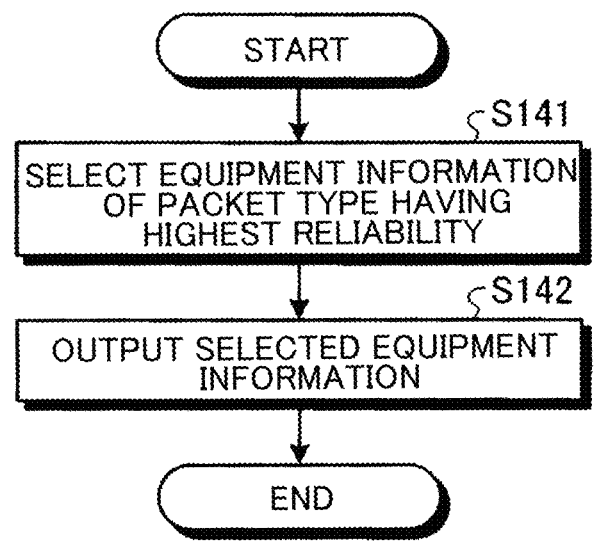
FIG. 11 is a flowchart that indicates the flow of a process for the tertiary inference.

The following explains the tertiary inference (step S14 in FIG. 8), using FIG. 11. FIG. 11 is a flowchart that indicates the flow of a process for the tertiary inference. As indicated in FIG. 11, the inference device 10 first selects the equipment information of a packet type having a highest level of reliability among the packet types (step S141). Then, the inference device 10 outputs the selected equipment information (step S142).

Effect of First Embodiment

As has been explained above, the extraction unit 141 extracts predetermined pieces of information from each of the plurality of packets sent from the equipment 20. Then, the inference unit 142 infers a piece of equipment information that is information on the equipment 20, for each of the plurality of packets on the basis of the information extracted by the extraction unit 141. Then, the first selection unit 143 selects a predetermined piece of equipment information for each packet type from among the equipment information on the basis of a level of detail of each piece of equipment information. Then, the second selection unit 144 selects, on the basis of a level of reliability predefined according to each packet type, a predetermined piece of equipment information corresponding to the equipment 20 from among the equipment information inferred by the first selection unit 143. As seen above, the inference device 10 can infer equipment information by using multiple packets that are not limited to a specific protocol or packet type. As a result, the inference device 10 is capable of providing clear information on the equipment that has sent the packets.

Alternatively, the inference device 10 can sometimes obtain a more detailed inference result than conventional methods. For example, the inference device 10 can sometimes identify not only the name, distribution, and version of an OS, but also the release of the OS. In this case, the inference device 10 can infer by combining the inference result with information on the support period whether an inferred OS is within its support period.

The first selection unit 143 selects apiece of equipment information having a highest level of detail for each packet type from among the equipment information. Then, the second selection unit 144 is capable of selecting a piece of equipment information selected by the first selection unit 143 and corresponding to a packet type having a highest reliability. As seen above, the inference device 10 infers the equipment information in consideration of both of the level of detail and the level of reliability. As a result, the inference device 10 is capable of providing a more accurate inference result.

Prior to selection by the first selection unit 143, the inference unit 142 classifies the equipment information according to the types of the equipment information inferred by the inference unit, and excludes a piece of equipment information having a low frequency of appearance among the equipment information from the selection. Even if a piece of equipment information having a high level of detail is obtained from a certain packet, the piece of equipment information could be incorrect in the case where this packet is of a high spoofing possibility type. In contrast, the inference device 10 excludes such a piece of equipment information from targets of inference, thus enhancing the accuracy.

The inference unit 142 is capable of inferring the equipment information by comparing a piece of information extracted by the extraction unit 141 with dictionary-format data beforehand prepared for each packet type, or by analyzing a piece of information extracted by the extraction unit 141 by a beforehand-prepared rule. The inference device 10 can utilize, as the dictionary or the rule, an open database (DB) and an open rule that are present for each packet type. This facilitates the maintenance of dictionaries and rules.

In the case where the inference unit 142 infers the equipment information by comparison with the dictionary-format data, the first selection unit 143 can select a piece of equipment information on the basis of the level of detail included in the dictionary-format data. Alternatively, in the case where the inference unit 142 infers the equipment information by rule-based analysis, the first selection unit 143 selects a piece of equipment information on the basis of the level of detail that is calculated in accordance with a preset condition. As seen above, the inference device 10 can automatically define the level of detail, and thus is capable of efficiently performing the inference process.

Another Embodiment

Figure 12:
FIG. 12 is an illustration for explaining the level of detail.

The above has explained that the inference device 10 infers information on an OS as equipment information. On the other hand, the equipment information is not limited to information on an OS. For example, the inference device 10 may infer the model of the equipment 20 as equipment information. In addition, the level of detail in this case may be defined as in FIG. 12. FIG. 12 is an illustration for explaining the level of detail. For example, in the case where the type, manufacturer, model, and model number are identified by dictionary matching, four is added to the level of detail. Alternatively, for example, in the case where the type and manufacturer are identified by dictionary matching but the model and model number are not identified, two is added to the level of detail.

System Configuration or the Like

The constituent elements of the devices as illustrated are functionally conceptual, and are not necessarily required to be physically configured as illustrated. That is to say, the specific form of the devices including distribution and integration is not limited to the form as illustrated; the whole or some of the devices can be configured to be functionally or physically distributed or integrated in any unit in accordance with various loads, usages, etc. Furthermore, the processing functions performed by the devices can, in whole or in arbitrarily given part, be fulfilled by a CPU or a program that is analyzed and executed by the CPU, or can be fulfilled as hardware using wired logic.

Alternatively, among the processes explained in the present embodiments, the whole or part of a process that has been explained to be automatic can be performed manually, or the whole or part of a process that has been explained to be manual can be performed automatically by a publicly-known method. Besides, the steps of a process, the steps of control, specific names, information including various data and parameters indicated in the description above and drawings can arbitrarily be changed unless otherwise specified.

Program

As one embodiment, the inference device 10 can function by installing, on a desired computer, an inference program that executes the inference of equipment information as package software or online software. For example, an information processing unit can function as the inference device 10 by causing the information processing device to execute the inference program above. Such information processing devices as referred to here include a desktop or laptop personal computer. Alternatively, the scope of the information processing devices further includes mobile communication terminals such as smart phone, mobile telephone, and personal handyphone system (PHS), and slate terminals such as a personal digital assistant (PDA).

Alternatively, with a terminal device for use by a user serving as a client, the inference device 10 functions as an inference server device that provides the client with a service for the inference of equipment information. For example, the inference server device functions as a server device that provides an inference service using a packet as an input and equipment information as an output. The inference server device in this case may function as a web server, or may function as a cloud that provides a service for the inference of equipment information by outsourcing.

Figure 13:
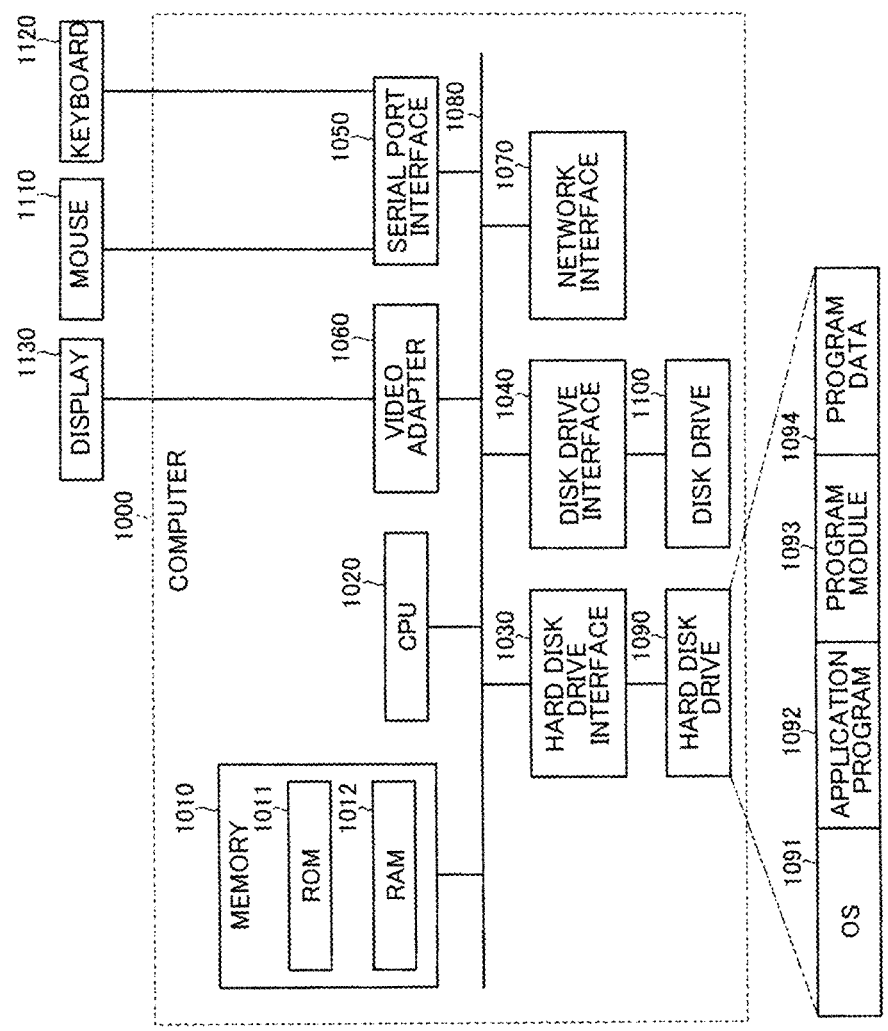
FIG. 13 illustrates one example of a computer that executes an inference program.

FIG. 13 illustrates one example of a computer that executes the inference program. A computer 1000 includes, for example, a memory 1010 and a CPU 1020. The computer 1000 further includes a hard disk drive interface 1030, a disk drive interface 1040, a serial port interface 1050, a video adapter 1060, and a network interface 1070. These parts are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. The disk drive 1100 allows, for example, a removable storage medium such as a magnetic disk and an optical disc to be inserted thereinto. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is to say, a program that defines the processing of the inference device 10 is configured as the program module 1093 including the description of a code capable of being executed by a computer. The program module 1093 is stored in, for example, the hard disk drive 1090. For example, the program module 1093 for executing a similar process to that performed with the functional configuration of the inference device 10 is stored in the hard disk drive 1090. Note that the hard disk drive 1090 may be substituted by an SSD.

Setting data for use in the processes of the embodiments above is stored as the program data 1094 in, for example, the memory 1010 or the hard disk drive 1090. The CPU 1020 reads the program module 1093 and the program data 1094 stored in the memory 1010 or the hard disk drive 1090 to the RAM 1012 as needed to execute the processes of the embodiments.

Note that the program module 1093 or the program data 1094 are not necessarily stored in the hard disk drive 1090, and may be stored in, for example, a removable storage medium, and may be read by the CPU 1020 via the disk drive 1100 or the like. Alternatively, the program module 1093 and the program data 1094 may be stored in another computer connected thereto via a network (local area network (LAN), wide area network (WAN), or the like). Then, the program module 1093 and the program data 1094 may be read by the CPU 1020 via the network interface 1070 from this other computer.

REFERENCE SIGNS LIST

10 Inference device
11 Communication unit
12 Input output unit
13 Storage unit
14 Control unit
20 Equipment
131 Dictionary information
132 Rule information
133 Type information
141 Extraction unit
142 Inference unit
143 First selection unit
144 Second selection unit

The invention claimed is:

1. An inference device comprising:
extraction circuitry that extracts predetermined pieces of information from each of a plurality of packets and sent from equipment, at least one of the plurality of packets being a TCP SYN packet and at least one of the pieces of information include a p0f signature;
inference circuitry that infers a piece of equipment information that is information on the equipment, for each of the plurality of packets, on the basis of the pieces of information extracted by the extraction circuitry;
first selection circuitry that selects a predetermined piece of equipment information for each packet type from among pieces of equipment information, on the basis of a level of detail of each piece of equipment information; and
second selection circuitry that selects, on the basis of a level of reliability predefined according to each packet type, a predetermined piece of equipment information corresponding to the equipment from among pieces of equipment information inferred by the first selection circuitry, wherein
the inference circuitry infers the piece of equipment information by comparing a piece of information extracted by the extraction circuitry with dictionary-format data beforehand prepared for each packet type, or by analyzing a piece of information extracted by the extraction circuitry by a beforehand-prepared rule,
in a case where the inference circuitry infers the piece of equipment information by comparison with the dictionary-format data, the first selection circuitry selects a piece of equipment information on the basis of a level of detail included in the dictionary-format data,
in a case where the inference circuitry infers the piece of equipment information by analysis with the rule, the first selection circuitry selects a piece of equipment information on the basis of a level of detail calculated in accordance with a preset condition, and
the preset condition includes a combination of characters strings and signs extracted from each of the plurality of packets.

2. The inference device according to claim 1, wherein
the first selection circuitry selects pieces of equipment information having a highest level of detail for each packet type from among the pieces of equipment information, and
the second selection circuitry selects a piece of equipment information from the pieces of equipment information selected by the first selection circuitry as having the highest level of detail and which corresponds to a packet type having a highest level of reliability.

3. The inference device according to claim 1, wherein prior to selection by the first selection circuitry, the inference circuitry classifies the pieces of equipment information according to types of the pieces of equipment information inferred by the inference circuitry, and excludes a piece of equipment information having a lowest frequency of appearance among the pieces of equipment information from the selection.

4. The inference device according to claim 2, wherein the piece of equipment information having the highest detail level is determined as a piece of equipment information that identifies both an operating system of the equipment and a version of the operating system of the equipment.

5. The inference device according to claim 4, wherein a piece of equipment information having a lowest detail level is a piece of equipment information identifying only the operating system of the equipment.

6. The inference device according to claim 5, wherein the packet having the highest level of reliability is a packet least likely to be spoofed.

7. The inference device according to claim 6, wherein the packet least likely to be spoofed is a TCP SYN+ACK packet.

8. The inference device according to claim 7, wherein a reliability level of a packet is inversely proportional to a likelihood of spoofing the packet.

9. The inference device according to claim 1, wherein the inference circuitry is further configured to sort the plurality of packets based on a MAC address and sender IP address included in each of the plurality of packets.

10. The inference device according to claim 1, wherein the equipment is identified based on an operating system and operating system version, which are determined from a p0f signature in a TCP SYN+ACK packet sent by the equipment.

11. An inference method executed by a computer, comprising:
extracting predetermined pieces of information from each of a plurality of packets and sent from equipment, at least one of the plurality of packets being a TCP SYN packet and at least one of the pieces of information include a p0f signature;
inferring a piece of equipment information that is information on the equipment, for each of the plurality of packets on the basis of the pieces of information extracted by the extraction step;
first selecting a predetermined piece of equipment information for each packet type from among pieces of equipment information, on the basis of a level of detail of each piece of equipment information; and
second selecting, on the basis of a level of reliability predefined according to each packet type, a predetermined piece of equipment information corresponding to the equipment from among pieces of equipment information inferred by the first selecting, wherein
the piece of equipment information is inferred by comparing a piece of information extracted with dictionary-format data beforehand prepared for each packet type, or by analyzing a piece of information extracted by a beforehand-prepared rule,
in a case where the piece of equipment information is inferred by comparison with the dictionary-format data, a piece of equipment information is selected on the basis of a level of detail included in the dictionary-format data,
in a case where the piece of equipment information is inferred by analysis with the rule, a piece of equipment information is selected on the basis of a level of detail calculated in accordance with a preset condition, and
the preset condition includes a combination of characters strings and signs extracted from each of the plurality of packets.

12. A non-transitory computer-readable memory storing an inference program for causing a computer to perform the method of claim 11.

13. The inference method according to claim 11, wherein the piece of equipment information having the highest level of detail is determined as a piece of equipment information that identifies both an operating system of the equipment and a version of the operating system of the equipment.

14. The inference method according to claim 13, wherein a piece of equipment information having a lowest level of detail is a piece of equipment information identifying only the operating system of the equipment.

15. The inference method according to claim 14, further comprising sorting the plurality of packets based on a MAC address and sender IP address included in each of the plurality of packets.

16. The inference method according to claim 15, wherein the equipment is identified based on an operating system and operating system version, which are determined from a p0f signature in a TCP SYN+ACK packet sent by the equipment.

17. A non-transitory computer-readable memory storing an inference program for causing a computer to function as the inference device according to claim 1.

* * * * *